Dec. 4, 1962  H. G. HEINSOHN ET AL  3,067,274

DEFERRED ACTION BATTERY

Filed Sept. 12, 1958

INVENTORS
THADIUS KONDELL
HENRY G. HEINSOHN
BY
ATTORNEY

United States Patent Office 3,067,274
Patented Dec. 4, 1962

3,067,274
DEFERRED ACTION BATTERY
Henry G. Heinsohn, Bedford, and Thadius Kondell, Strongsville, Ohio, assignors to The Electric Storage Battery Company, a corporation of New Jersey
Filed Sept. 12, 1958, Ser. No. 760,602
3 Claims. (Cl. 136—90)

This invention generally relates to apparatus for storing and transferring fluids from a reservoir to an appropriate receptacle. The present invention has particular utility in a deferred action battery in which the electrolyte is stored in a reservoir out of contact with the plates of the battery until it is desired to activate the battery.

Since, in a deferred action battery, the electrolyte is stored apart from the plates of the battery until the battery is activated, deferred action batteries are particularly adapted for applications requiring prolonged storage in a charged state. In this manner, premature loss of charge and deterioration of battery components is prevented. Such batteries, however, must be adapted for instantaneous activation by the rapid transfer of the electrolyte from the storage reservoir to the cell compartments of the battery.

It is, therefore, an object of the present invention to provide a new and improved electrolyte storage reservoir and transfer means for a deferred action battery.

Another object of the present invention is to provide, in a deferred action battery, means operative to achieve positive and rapid transfer of the electrolyte from the storage reservoir to the cell compartments of the battery.

A further object of the present invention is to provide an electrolyte transfer means for a deferred action battery that can be operated by a vacuum derived from an evacuated battery casing, external gas pressure, or a combination of vacuum and gas pressure.

A still further object of the present invention is to utilize a new and improved manifold, connecting the electrolyte storage reservoir with the cell compartments of the battery which, in combination with the novel electrolyte transfer means, will achieve rapid and reliable transfer of the electrolyte from the storage reservoir to the cell compartments of the battery.

In accordance with the principles of the present invention, the foregoing objects are achieved by means of structure which includes an electrolyte reservoir comprising a concave wall and a convex diaphragm joined at their peripheries. The convex diaphragm is adapted to be deformed from a convex state to a concave state, wherein it substantially conforms with the concave wall of the reservoir, to collapse the reservoir and expel the electrolyte therefrom. The reservoir is connected to a manifold communicating with the cell compartments of the battery and is separated therefrom by a rupturable disc. To activate the system, an explosive charge, in the form of an electric squib, is fired to drive knife means, carried by the convex diaphragm, through the rupturable disc. The convex diaphragm is then deflected toward the concave wall of the reservoir by means of a differential pressure which may be derived by having the battery under vacuum or by means of gas generated by the energization of the electric squib acting on the outside of the diaphragm, or a combination of both. As a result of the differential pressure acting on the diaphragm, the electrolyte reservoir is collapsed and the electrolyte driven therefrom and through the manifold into the cell compartments of the battery. In this respect, the knife means which is attached to and moves with the diaphragm enters the battery manifold and acts as a baffle which aids in driving electrolyte from the manifold into the cell compartments.

A better understanding of the present invention may be had from the following description when read with reference to the accompanying drawings of which:

Figure 1:
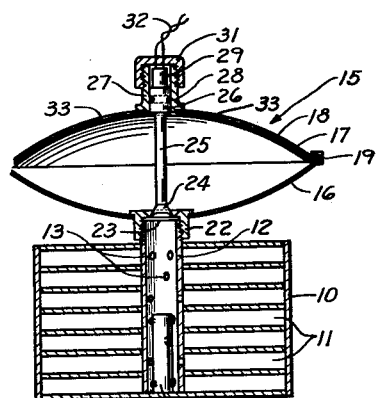
FIG. 1 is a side elevation, taken in section, of an embodiment of the present invention adapted to be operated by means of a vacuum.
Figure 2:
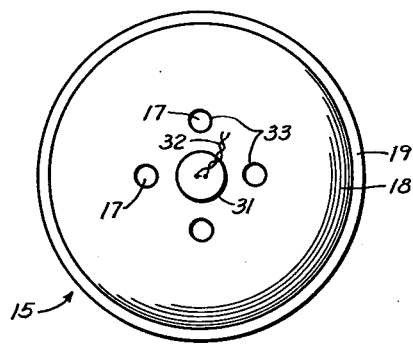
FIG. 2 is a top view of the embodiment of the present invention shown in FIG. 1.

Referring now to FIGS. 1 and 2, the numeral 10 designates a battery casing having a plurality of cell compartments 11. In an effort to simplify the disclosure of the present invention, and since plates and separators are well known in the art, these have not been illustrated in the drawings. Each of the cell compartments 11 communicates with the manifold 12, by means of ports 13 in the manifold 12. As shown, the battery casing 10 is cylindrical in shape and concentric with the manifold 12 which passes through each of the cell compartments 11 at their centers. Three ports 13 are provided in the manifold 12 for each cell compartment, the ports being equally spaced around the manifold 12. In order to achieve more rapid and even flow of electrolyte into the cell compartments 11 from the manifold 12, the ports 13, for contiguous cell compartments 11, are staggered so that none of them are adjacent to each other. The manifold 12 is provided with a cylindrical baffle 14 which extends upward from the bottom of the manifold 12 approximately half its length, the baffle being spaced from the walls of the manifold. As will be explained in more detail hereinafter, the baffle 14 aids in equalizing the rate of flow of electrolyte into the cell compartments 11.

The numeral 15 generally designates an electrolyte reservoir which is mounted on the top of the manifold 12. To this end, the manifold 12 extends beyond the battery casing 10 and is threaded for connection to the electrolyte reservoir 15. The electrolyte reservoir 15 comprises a concave wall 16, a convex diaphragm 17 and an outer convex wall 18 which are joined at their peripheries by means of a lap joint 19. The concave wall 16 and the convex diaphragm 17 define a hollow compartment adapted to house the battery electrolyte prior to battery activation. The electrolyte reservoir 15 is mounted on the manifold 12 by means of a bushing 22 in the bottom of the concave wall 16. As shown, the bushing 22 is threaded and is adapted to be screwed on the end of the manifold 12. The electrolyte reservoir 15 is separated from the manifold 12 by means of a rupturable disc or valve 23 which may be sealed in the bushing 22 or on the manifold 12. The diaphragm 17, which may be made from a thin flexible sheet of silver, stainless steel or some other metal inert to attack by electrolyte is adapted to be deformed from its convex state, in which it substantially conforms with the outer convex wall 18, to a concave state, where it substantially conforms with the concave wall 16. The knife means 24 is attached to the diaphragm 17 of the electrolyte reservoir 15 by means of the rod 25. As shown in FIG. 1, the knife means 24, which is circular, rests on the rupturable disc 23 and is adapted, when activated, to cut the disc 23, permitting the electrolyte within to be expelled into the cell compartments 11 of the battery casing 10. The rod 25 extends through the diaphragm 17 and terminates in a piston 26 which is housed in a bushing 27 on the outer convex wall 18. The piston 26 and the rod 25 are attached to the diaphragm 17 and hence, they and the knife 24 are adapted to move with the diaphragm 17 when it is deformed from a convex state to a concave state. To this end, the piston 26 is slidable in the bushing 27. The knife means 24, rod 25, and piston 26 are adapted to be forced downward to cut the disc 23 by means of an explosive charge, which may be in the form of an electric squib 29, which is housed in the bushing 27 directly above the piston 26. As shown, the squib 29 is sealed in the bushing 27 by means of the threaded cap 31. The wire leads 32 from the squib 29 pass through and are sealed in the cap 31. This piston 26 is provided with an O ring 28 in order to achieve a gas tight seal between the piston 26 and the bushing 27.

The transfer of electrolyte between the electrolyte reservoir 15 and the battery casing 10 in the deferred action battery of the present invention is accomplished by cutting the disc 23 between the electrolyte reservoir 15 and the battery casing 10 and deforming the diaphragm 17 to collapse the electrolyte chamber. As mentioned hereinbefore, the disc 23 is ruptured by detonating the electric squib 29. The diaphragm 17 of the electrolyte reservoir 15 is then driven toward the concave wall 16 by applying a differential pressure thereto. The differential pressure may be generated in any one of three ways. First, the differential pressure may be achieved by means of a vacuum, derived from an evacuated battery casing 10 acting on the inner surface of the diaphragm 17 in combination with atmospheric pressure acting on the outer surface of the diaphragm 17. Secondly, the differential pressure can be derived by means of gas pressure generated by the electric squib 29 acting upon the piston 26 and the outer surface of the diaphragm 17 against atmospheric pressure acting on the inner surface of the snap action diaphragm 17 where the battery casing 10 is not under vacuum. It will be obvious to those skilled in the art that a combination of vacuum and pressure may also be utilized.

In the embodiment of the present invention shown in FIGS. 1 and 2, the deferred action battery is operated by means of a differential pressure derived from a combination of atmospheric pressure and vacuum. To this end, the battery casing 10 is sealed to maintain it under vacuum. The outer surface of the diaphragm 17 is subjected to atmospheric pressure by means of a plurality of openings 33 provided in the outer convex wall 18 of the electrolyte reservoir 15. To activate the system, the electric squib 29 is detonated by connection of leads 32 to a suitable source of electric current. The detonation of the squib 29 drives the piston 26 downward causing the knife 24 to cut the rupturable disc 23 which separates the electrolyte reservoir from the battery casing 10. Upon rupture of the disc 23, the diaphragm 17 and the electrolyte are subjected to the vacuum which had been maintained within the battery casing 10, and as a result of the atmospheric pressure acting on its outer surface, the diaphragm 17 deflects downward toward the concave wall 16. At the same time, the vacuum draws the electrolyte into the manifold 12. As battery activation proceeds, the volume of the reservoir 15 is reduced until it is completely collapsed, with the diaphragm 17 conforming to concave wall 16, and the electrolyte is driven into the manifold 12 and the cell compartments of the battery.

As mentioned hereinbefore, the knife 24 and the rod 25 are attached to the diaphragm 17 and accordingly, as it is deflected toward the concave wall 16, the knife 24 and the rod 25 enter the manifold 12. When the diaphragm 17 is in its concave state substantially mating with the concave wall 16, the knife 24 seats on top of the baffle 14 and, with the rod 25, forms an additional baffle, cooperating with the baffle 14 in driving electrolyte from the manifold 12 into the cell compartments 11. In this connection, reference should be had to FIG. 3 which shows an embodiment of the present invention, operated by gas pressure, after activation. It should be noticed, that, after activation, the diaphragm 17 seals the manifold 12 to prevent any possibility of electrolyte leaking back into the reservoir 15 even though the battery might be in an inverted position.

The manifold 12 and the battery casing 10 are specifically designed to provide even and rapid filling of all the cell compartments 11. To this end, the manifold 12 fills the compartments 11 from their centers. The baffle 14 in the manifold 12 is provided to counteract the tendency of the initial influx of electrolyte to accumulate in the bottom of the manifold 12, and fill the lower cell compartments first to the detriment of the upper compartments. In this manner, more even filling of the cell compartments is achieved. Still further, the rod 25, as it passes through the bushing 22, forms therewith a nozzle which directs electrolyte outward against the walls of the manifold 12 and into the ports 13. The rod 25 and the knife 24 also act as an additional baffle in the manifold 12 cooperating with the baffle 14 to drive electrolyte through the ports 13.

Figure 3:
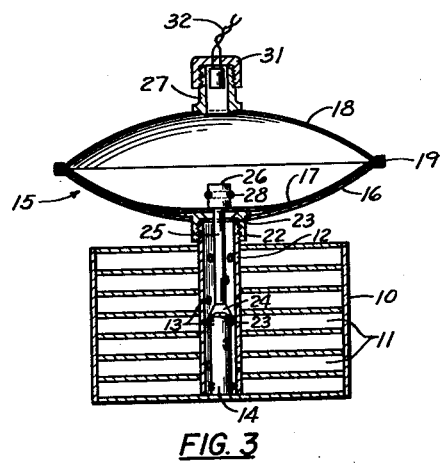
FIG. 3 is a side elevation, taken in section, of an embodiment of the present invention, after activation, which has been operated by means of gas pressure.

Referring now to FIG. 3, there is shown an embodiment of the present invention, after activation, which has been operated by means of gas pressure. Similar reference characters have been employed to designate components corresponding to those in FIGS. 1 and 2 and for simplicity, the description and operation of these components will not be described in detail. The embodiment of the present invention shown in FIG. 3 differs from the embodiment shown in FIGS. 1 and 2 in three respects. First, the battery casing 10 need not be under vacuum. If, however, the casing 10 is evacuated and maintained under vacuum, such a vacuum will aid in the mode of operation to be described. Secondly, the outer convex wall 18 of the electrolyte reservoir 15 does not have the openings 33 of FIGS. 1 and 2 and consequently, the diaphragm 17 is not exposed to atmospheric pressure. Thirdly, the electric squib 29 is of the type which is operative to generate a gas pressure as opposed to the force generating squib utilized in the embodiment of the present invention shown in FIGS. 1 and 2. Upon the detonation of the electric squib 29, the knife means 24 cuts the disc 23. The gas generated then forces the piston 26 out of the bushing 27 and the gas fills the area between the outer convex wall 18 and the diaphragm 17. As the gas pressure builds up, the diaphragm 17 is deflected downward until the reservoir is collapsed. Except for the generation of the gas pressure, the operation of the battery of FIG. 3 is identical to the operation of the embodiment described in connection with FIGS. 1 and 2. It will be obvious to one skilled in the art that if the cell compartments 11 are under vacuum, this vacuum will cooperate with the gas pressure applied to the piston 26 in deflecting the snap action diaphragm 17 downward.

From the foregoing, it can be seen that by means of the present invention, there has been provided a deferred action battery which is operable to provide rapid and positive transfer of electrolyte from the storage reservoir to the cell compartments of the battery. The novel structure utilized permits this battery to be activated by means of a vacuum, gas pressure or a combination of both vacuum and gas pressure. Still further, the novel combination of the electrolyte reservoir and transfer means with the battery manifold, in which the knife means 24 and rod 25 travel into the manifold 12 to form a baffle therein, aids in driving the electrolyte from the manifold 12 into the cell compartments.

In applications wherein the battery of the present invention is subject to low temperatures, the construction utilized is particularly adapted to cooperate with heating means, which may be either chemical or electrical in nature, to insure rapid heating of the electrolyte. To this end, all the components of the electrolyte reservoir 15 are metallic which will insure efficient heat transfer to the electrolyte within the reservoir. In addition, the entire reservoir may be surrounded with heating means and not just a limited area as in prior art deferred action batteries.

Having described the present invention, that which is claimed as new is:

1. A deferred action battery comprising, in combination, a battery casing having a plurality of cell compartments adapted to receive electrolyte, a manifold having ports connecting it to the cell compartments, an electrolyte reservoir, a bushing connecting said reservoir to said manifold, a baffle in the center of said manifold extending approximately half its length from the end of the manifold opposite to the connection between said electrolyte reservoir and said manifold, one wall of said reservoir comprising a diaphragm adapted to be deformed by means of a differential pressure acting thereon to collapse said reservoir, rupturable means separating said reservoir from said manifold, knife means carried on a rod affixed to said diaphragm for cutting said rupturable means, said knife means being positioned on said diaphragm adjacent to said rupturable means so as to enter said manifold through said rupturable means and seat on said baffle when said diaphragm collapses said reservoir, said rod and said bushing forming a nozzle which directs electrolyte against the walls of the manifold and into the ports connecting said manifold with said cell compartments, and actuating means for causing said knife means to rupture said rupturable means and subject said diaphragm to a differential pressure.

2. Apparatus as specified in claim 1 wherein said battery casing is maintained under vacuum to provide said differential pressure.

3. Apparatus as specified in claim 1 wherein said last mentioned means comprises a gas generating means.

References Cited in the file of this patent

UNITED STATES PATENTS

| | | |
|---|---|---|
| 2,824,164 | Bauman | Feb. 18, 1958 |
| 2,847,494 | Jeannin | Aug. 12, 1958 |
| 2,851,510 | Pauli | Sept. 9, 1958 |
| 2,852,592 | Saulauze | Sept. 16, 1958 |
| 2,937,220 | Bauman | May 17, 1960 |

FOREIGN PATENTS

| | | |
|---|---|---|
| 726,391 | Great Britain | Mar. 16, 1955 |